(No Model.)

D. W. REES.
CAR AXLE LUBRICATOR.

No. 306,959. Patented Oct. 21, 1884.

WITNESSES
C. W. Dashiell
E. G. Siggers

David W. Rees
INVENTOR
By C. A. Snow & Co.
Attorneys

UNITED STATES PATENT OFFICE.

DAVID WILLIAM REES, OF CANAL DOVER, OHIO, ASSIGNOR OF THREE-FOURTHS TO JOHN A. HOSTETLER, GEO. B. DEARDORFF, AND GEO. H. URPMAN, ALL OF SAME PLACE.

CAR-AXLE LUBRICATOR.

SPECIFICATION forming part of Letters Patent No. 306,959, dated October 21, 1884.

Application filed July 1, 1884. (No model.)

*To all whom it may concern:*

Be it known that I, DAVID W. REES, a citizen of the United States, residing at Canal Dover, in the county of Tuscarawas and State of Ohio, have invented a new and useful Car-Wheel and Lubricator Combined, of which the following is a specification, reference being had to the accompanying drawings.

This invention has relation to car-wheels and car-axle lubricators combined; and it consists in the construction and novel arrangement of parts, as will be hereinafter fully described, and particularly pointed out in the claims.

Figure 1:
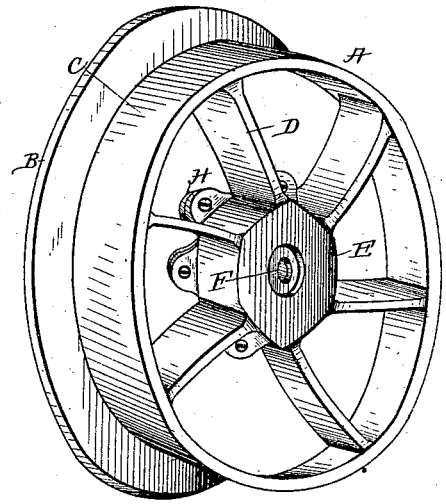
Figure 2:
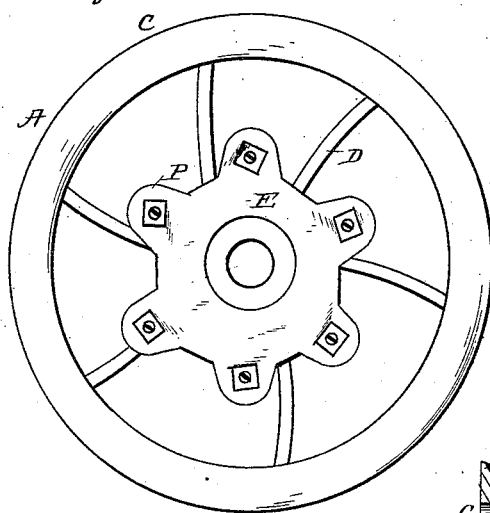
Figure 3:
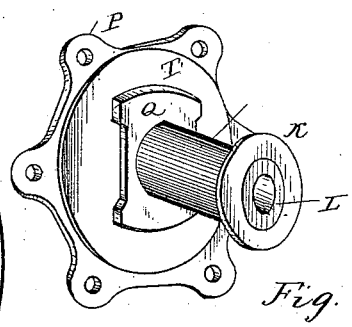
Figure 4:
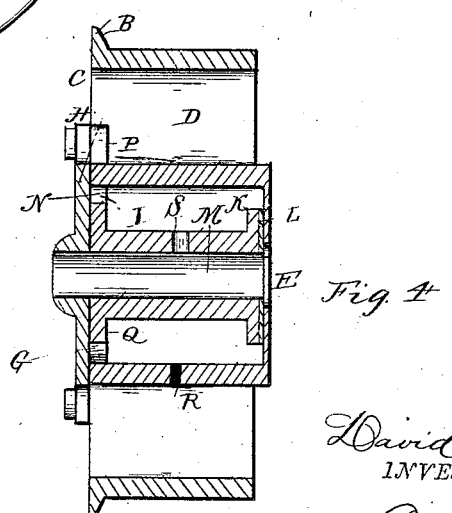

Figure 1 is a view in perspective of a car-wheel embodying my improvements. Fig. 2 is a view in perspective of the inner portion of the hub detached. Fig. 3 is an elevation from the inner side of the wheel. Fig. 4 is a transverse vertical sectional view.

Referring by letter to the accompanying drawings, A designates the car-wheel, having the usual flange, B, and tire C, and the short curved radial spokes D. These spokes D extend from the lubricating-box E, which is cast integral with them, to the tire C. The box E forms a part of the hub of the wheel, and is provided with a circular opening, F, in its outer end and an elongated opening, G, in its inner end, having straight parallel sides and outwardly-curved ends. This inner end between the curved radial spokes is provided with perforated lugs H. The interior portion, I, of the hub is fitted or journaled upon the axle, and is provided at its outer end with an annular flange, K, provided on its outer face with packing L, of any suitable material that will keep the oil in the oil-box E. The axle-box M, annular flange K, and the inner attaching-plate, N, are cast integral, and the attaching-plate N has perforated lugs P, to match the lugs H. The attaching-plate N is provided on its inner face with a raised portion, Q, of a shape corresponding to the shape of the elongated opening in the inner face of the oil-box. The oil-box E is provided with an opening, R, through which the oil is fed to the oil-box, and the axle-box also has a hole, S, through which the oil flows to the axle; but these holes are not aligned. The inner face of the attaching-plate N is also provided with packing T, which prevents the oil from escaping from the oil-box between the plates of the oil-box and the attaching-plate. The axle-box and oil-box are secured together by bolts passed through the perforations of their respective lugs and secured in place by nuts. The annular flange at the end of the axle-box closes the opening in the outer end of the oil-box, and the packing on the face of said flange prevents the oil from escaping through the opening. By having packing at both ends of the hub the oil-box is made perfectly tight and prevents the escape of the oil, and prevents the admission of water and dirt to the oil-box. The raised portion Q on the attaching-plate prevents the hub from turning in the oil-box.

This improved car-wheel and car-axle lubricator possesses superior advantages in point of economy, utility, and general efficiency.

Having thus fully described my invention, what I claim as new, and desire to secure by Letters Patent of the United States, is—

1. The combination, with a car-wheel having an oil-box cast integral therewith, and provided in its outer end with an opening and in its inner end with an elongated opening having straight sides and outwardly-curved ends, of an axle-box provided at its outer end with an annular flange and at its inner end with a plate provided on its inner face with a raised portion corresponding in shape to the outline of the elongated opening, and the perforated lugs and the bolts and securing-nuts, substantially as specified.

2. The combination, with a car-wheel having the oil-box cast integral at the hub portion, and provided with a circular opening in its outer end, an elongated opening in its inner end, and perforated securing-lugs on the edge of the plate provided with the elongated opening, of the axle-box having an annular flange on its outer end and an attaching-plate on its inner end, both of which are provided with packing on the faces toward the outer end of the axle, and the raised portion Q on the face of the attaching-plate, and bolts and nuts for attaching the axle-box to the wheel, substantially as specified.

In testimony that I claim the foregoing as my own I have hereto affixed my signature in presence of two witnesses.

DAVID WILLIAM REES.

Witnesses:
ALFRED GUEDLE,
P. H. DEIS.